United States Patent [19]

Dalin et al.

[11] Patent Number: 4,910,969
[45] Date of Patent: Mar. 27, 1990

[54] APPARATUS FOR HEAT RECOVERY BY USING A HEAT-PUMP SYSTEM

[76] Inventors: Par Dalin, Murarvagen 7, S-16145 Bromma; Per Goransson, Jaktvagen 76, S-18341 Toby, both of Sweden

[21] Appl. No.: 272,778
[22] PCT Filed: Feb. 18, 1988
[86] PCT No.: PCT/EP88/00119
 § 371 Date: Oct. 18, 1988
 § 102(e) Date: Oct. 18, 1988
[87] PCT Pub. No.: WO88/06258
 PCT Pub. Date: Aug. 25, 1988

[30] Foreign Application Priority Data

Feb. 19, 1987 [DE] Fed. Rep. of Germany ....... 3705332

[51] Int. Cl.$^4$ .............................................. F25B 27/00
[52] U.S. Cl. .................................. 62/238.6; 62/323.1; 237/2 B
[58] Field of Search ............ 237/2 B; 62/238.6, 238.3, 62/324.1, 323.1, 323.3

[56] References Cited

U.S. PATENT DOCUMENTS 4,293,092 10/1981 Hatz .................................... 237/12.1

Primary Examiner—Henry A. Bennet
Attorney, Agent, or Firm—Hale and Dorr

[57] ABSTRACT

An apparatus for heat recovery by using a heat-pump system comprising an evaporator (14) configured as an air, water and/or earth collector and an internal combustion engine (2) as drive means, the exhaust gases from the internal combustion engine (2) being subjected to post-combustion in a separate post-combustion unit (3). The waste heat from the internal combustion engine (2) and the heat liberated upon post-combustion of the exhaust gases therefrom is supplied to a heat energy carrying medium, especially water of a heating system or the like, which has already been preheaed by the heat-pump system (5, 6). To this end the internal combustion engine (2) and the post-combustion unit (3) have heat exchangers (4, 15) cooperating therewith, respectively. Furthermore, measures are provided (exhaust gas coolers 7, 8, 9) for cooling the exhaust gases escaping to the atmosphere.

2 Claims, 1 Drawing Sheet

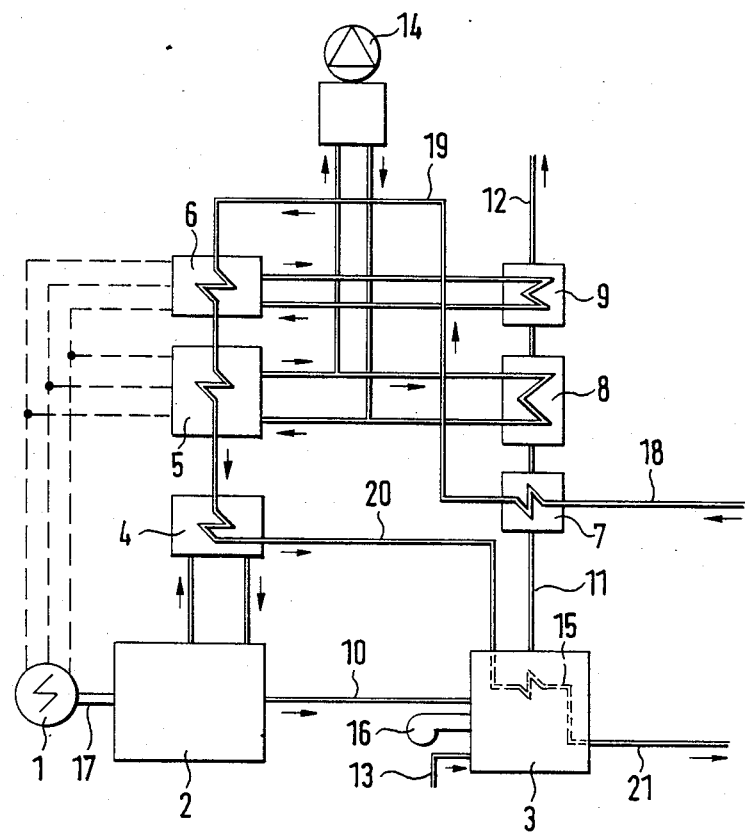

APPARATUS FOR HEAT RECOVERY BY USING A HEAT-PUMP SYSTEM

The present invention is directed to an apparatus for heat recovery by using a heat-pump system as specified in the preamble of patent claim 1.

A heat pump is a technical means which in operation takes up a heat flow at low temperature (cold side) and an energy flow required for operation and evolves both energy flows at a higher temperature (warm side) to be utilized as heat flow. The heat pump therefore is a heating means. It is employed in the fields of air conditioning, heating of buildings, swimming pools and in industrial processes. Depending on the heat source and the heat carrying medium, one distinguishes between water-to-water, air-to-water, water-to-air and air-to-air heat pumps. Possible heat pump designs include compression heat pumps driven by an electric motor or an internal combustion engine, and sorption heat pumps (absorption refrigerating machine) driven by thermal energy.

The present invention deals with a heat-pump system which is driven by an internal combustion engine. It is the object of the invention to additionally utilize the gases of combustion or exhaust gases from the internal combustion engine, which may be a diesel engine, a spark ignition engine or a gas engine, for additional heat recovery to thereby improve the efficiency (see in this respect DE-A-2,909,633). But in addition to an enhanced utilization of the exhaust-gas heat it is also intended to reduce the content of harmful substances in the exhaust gases so that the overall system provides for non-polluting heat recovery.

The specified object is solved by the characterizing features of patent claim 1, claim 2 describing a preferred further improvement of the inventive concept.

The apparatus according to the present invention is characterized by a separate combustion unit for post-combustion of the exhaust gases from the internal combustion engine and by heat exchangers which cooperate with both the internal combustion engine and the post-combustion unit and by means of which the heat liberated by post-combustion can be transferred to the heat energy carrying medium, especially water.

Due to the measures taken by the invention it is avoided that a considerable portion of the quantity of heat resulting from combustion wastefully escapes to the atmosphere together with the exhaust gases. Also, the energy immanent in the exhaust gas is utilized by post-combustion thereof, whereby a reduction of emissions and of harmful substances is achieved at the same time.

The combination proposed in accordance with the present invention, comprising a heat pump driven by an internal combustion engine and an exhaust gas post-combustion unit, constitutes a kind of bivalent heat recovery system, in which it is advantageous in extreme cases to additionally introduce fuel such as fuel gas or oil. Preferably, the additional introduction of fuel is temperature-controlled. In accordance with a preferred improvement of the invention, post-combustion is followed by cooling of the exhaust gases escaping to the atmosphere, wherein the exhaust gas cooling means used in this respect simultaneously are evaporators of the heat-pump system. Thus, exhaust gas cooling is performed with corresponding extraction of heat for pre-heating the heat energy carrying medium.

Preferably, cooling of the exhaust gases which escape to the atmosphere is conducted in stages until condensate is formed, the finally produced condensate being accumulated and removed. In this way an extremely non-polluting exhaust gas is vented to the atmosphere, said exhaust gas having a relatively low temperature which, however, must still be somewhat higher than ambient temperature in order to ensure sufficient venting. If necessary, exhaust gas blowers may also be provided.

Below, an embodiment of the invention will be described in detail with reference to the accompanying drawing. In the drawing, 2 indicates an internal combustion engine used for driving two series-arranged heat pumps 6 and 5 each via an electric generator 1. The electric generator 1 is coupled to the internal combustion engine 2 through an input shaft 17. The gases of combustion or exhaust gases from the internal combustion engine 2 are directed through an exhaust pipe 10 to an exhaust gas post-combustion unit 3 which has an oil burner 16 and a separate supply air pipe 13 cooperating therewith. The internal combustion engine 2 and the post-combustion unit 3 each have a heat exchanger 4 and 15 cooperating therewith, respectively, by means of which heat exchangers the waste heat from the internal combustion engine 2 and heat liberated by post-combustion can be transferred to a heat energy carrying medium such as water of a heating system, said medium having already been preheated by the mentioned heat pumps 5 and 6. The heat energy carrying medium, especially water, flows through the pipe sections 18, 19, 20 and 21. From the pipe section 21 the heat energy carrying medium exits from the heat recovery apparatus at a predetermined increased temperature. The cooled heat energy carrying medium returns through the pipe section 18.

The exhaust gas pipe 11, 12, through which the exhaust gases subjected to post-combustion are discharged to atmosphere, is provided with a heat exchanger 7 through which heat energy carrying medium is passed and with two exhaust gas coolers 8 and 9 which are used as evaporators of the heat pumps 5 and 6. The heat exchanger 7 is disposed intermediate the pipe sections 18 and 19 and has the two heat pumps 6 and 5 provided directly downstream thereof. Thus, the heat exchanger 7 already preheats the cooled heat energy carrying medium such as water before it reaches the heat pumps 6 and 5. Therein, the heat energy carrying medium is heated to increased temperature in two stages, i.e. first by the heat pump 6 and then by the heat pump 5. The energy required therefor is extracted by means of the exhaust gas coolers 8 and 9, on the one hand, from the exhaust gases discharged to atmosphere from the post-combustion unit 3 and, on the other hand, from the environment by means of an air, water and/or earth collector 14. The exhaust gas cooler 9 disposed upstream of the exhaust gas outlet 12 is used as evaporator of the initially effective heat pump 6, whereas the exhaust gas cooler 8, which as viewed in the direction of exhaust gas flow is upstream of the exhaust gas cooler 9, as well as the air, water and/or earth collector 14 are used as evaporators of the heat pump 5 disposed downstream of the heat pump 6. In this way gradual heating of the cooled heat energy carrying medium is achieved, initial heating being performed in the heat exchanger 7 disposed in the exhaust gas pipe 11.

Within the heat exchanger 4, which is disposed downstream of the heat pumps 6 and 5 and through which a portion of the waste heat from the internal combustion engine 2 is transferred, the temperature of the heat energy carrying medium is further increased. Through the subsequent pipe section 20 the heat energy carrying medium reaches the post-combustion unit 3 in which the heat energy carrying medium is heated to a still higher predetermined temperature. Heat transfer takes place through a heat exchanger 15 disposed in the post-combustion unit 3. It would also be conceivable to pass the pipe 20, through which the heat energy carrying medium flows, directly through the post-combustion unit 3, i.e. to expose the same directly to the flames within the post-combustion unit 3. But in this case accurate temperature control of the heat energy carrying medium becomes more difficult.

As explained above, the post-combustion unit 3 has an oil burner 16 additionally associated therewith, which also serves the purpose of initiating and maintaining post combustion of the exhaust gases from the internal combustion engine 2. But the consumption of oil is minimum because a considerable portion of the fuel is constituted by the exhaust gases from the internal combustion engine 2. Furthermore, a supply air line 13 is provided for maintaining practically complete exhaust gas combustion, any necessary oxygen being directed through said supply air line into the combustion space of the exhaust gas post-combustion unit 3.

In the exhaust gas pipe 11, 12 the exhaust gas (flue gas) is cooled down to 50° C. In case of further cooling down to about 20° C. exhaust gas blowers will be required to ensure sufficient venting of the exhaust gases to the atmosphere. Nitrogen oxides, hydrocarbons etc. may condense in the exhaust gas cooler 9. The formed condensate is preferably collected and removed. The exhaust gases escaping to the atmosphere are correspondingly harmless and relatively non-polluting as compared with the exhaust gases from conventional heat-pump systems operating with an internal combustion engine as drive unit.

All of the features disclosed in the present papers are claimed as being essential for the invention to the extent to which they are novel over the prior art either individually or in combination.

We claim:

1. An apparatus for heat recovery by using a heat-pump system comprising an evaporator (14) configured as an air, water and/or earth collector and an internal combustion engine (2) connected to heat pumps (5,6) as drive means for the heat pumps (5,6), exhaust gas heat exchangers (8,9) for utilizing the heat from the exhaust gases cooperating with the internal combustion engine (2), characterized by
a post-combustion unit (3) for post-combustion of the exhaust gases from the internal combustion engine (2), and heat exchangers (4, 15) cooperating with both the internal combustion engine (2) and the post-combustion unit (3), respectively, by means of which heat exchangers the waste heat from the internal combustion engine (2) and the heat released by post-combustion can be transferred to an energy carrying medium, especially water, which has already been preheated by the heat pumps (5,6), the exhaust gas post-combustion unit (3) being provided with a burner (16), and with a controlled supply air means (13).

2. The apparatus as claimed in claim 1, characterized in that two exhaust gas heat exchangers (8, 9) are disposed in the exhaust gas pipe (11, 12) of the exhaust gas post-combination unit (3), one (8) of said exhaust gas heat exchangers cooperating with a first heat pump (5) and at the same time functioning as an additional evaporator to the air, water and/or earth collector (14), while the other exhaust gas heat exchanger (9) cooperates with a second heat pump (6) as a single evaporator by means of which the exhaust gas can be further cooled—if desired down to the formation of condensate—prior to being vented to the atmosphere.

* * * * *